(12) United States Patent
Fedyk et al.

(10) Patent No.: US 12,574,475 B2
(45) Date of Patent: Mar. 10, 2026

(54) UNOBTRUSIVE SELF-VIEW FOR VIRTUAL MEETINGS

(71) Applicant: GOOGLE LLC, Mountain View, CA (US)

(72) Inventors: Ryan Fedyk, Brooklyn, NY (US); Anton Volkov, Seattle, WA (US)

(73) Assignee: Google LLC, Mountain View, CA (US)

( * ) Notice: Subject to any disclaimer, the term of this patent is extended or adjusted under 35 U.S.C. 154(b) by 149 days.

(21) Appl. No.: 18/406,513

(22) Filed: Jan. 8, 2024

(65) Prior Publication Data

US 2025/0227203 A1    Jul. 10, 2025

(51) Int. Cl.
| | |
|---|---|
| *H04L 65/403* | (2022.01) |
| *H04N 7/14* | (2006.01) |
| *H04N 7/15* | (2006.01) |

(52) U.S. Cl.
CPC .......... *H04N 7/157* (2013.01); *H04L 65/403* (2013.01); *H04N 7/147* (2013.01); *H04N 7/152* (2013.01)

(58) Field of Classification Search
None
See application file for complete search history.

(56) References Cited

U.S. PATENT DOCUMENTS

| | | | | |
|---|---|---|---|---|
| 12,081,599 | B1 * | 9/2024 | Paiuk | H04L 65/1089 |
| 2013/0063542 | A1 * | 3/2013 | Bhat | H04L 12/1822 |
| | | | | 348/E7.083 |
| 2022/0374136 | A1 * | 11/2022 | Chang | G06F 3/04845 |
| 2022/0374585 | A1 * | 11/2022 | Wang | G11B 27/34 |
| 2023/0188674 | A1 * | 6/2023 | Van Os | H04N 7/141 |
| | | | | 348/14.09 |
| 2023/0368444 | A1 * | 11/2023 | Blackburne | G06T 11/001 |
| 2025/0078870 | A1 * | 3/2025 | Lindmark | G11B 27/031 |
| 2025/0086873 | A1 * | 3/2025 | Baszucki | G06T 13/205 |
| 2025/0220130 | A1 * | 7/2025 | Hulaud | H04N 5/272 |

* cited by examiner

*Primary Examiner* — Quoc D Tran
(74) *Attorney, Agent, or Firm* — Lowenstein Sandler LLP

(57) ABSTRACT

A method for providing an unobtrusive self-view to participants of a virtual conference is provided. The method includes receiving a self-view video stream including a self-view of a user participating in a virtual meeting. The video stream is being acquired by a camera of the client device. The method includes causing the self-view video stream to be presented in a first self-view portion incorporated into a graphical user interface (GUI) control panel of a GUI displayed on the client device of the user. The GUI control panel can include a first control element to control the camera. The method can further include receiving a switch self-view command of the user, and responsive to receiving the switch self-view command, causing the self-view video stream to be presented in a second self-view portion located outside of the GUI control panel of the GUI displayed on the client device of the user.

20 Claims, 7 Drawing Sheets

300

Self-view UI portion 360

Figure 1:
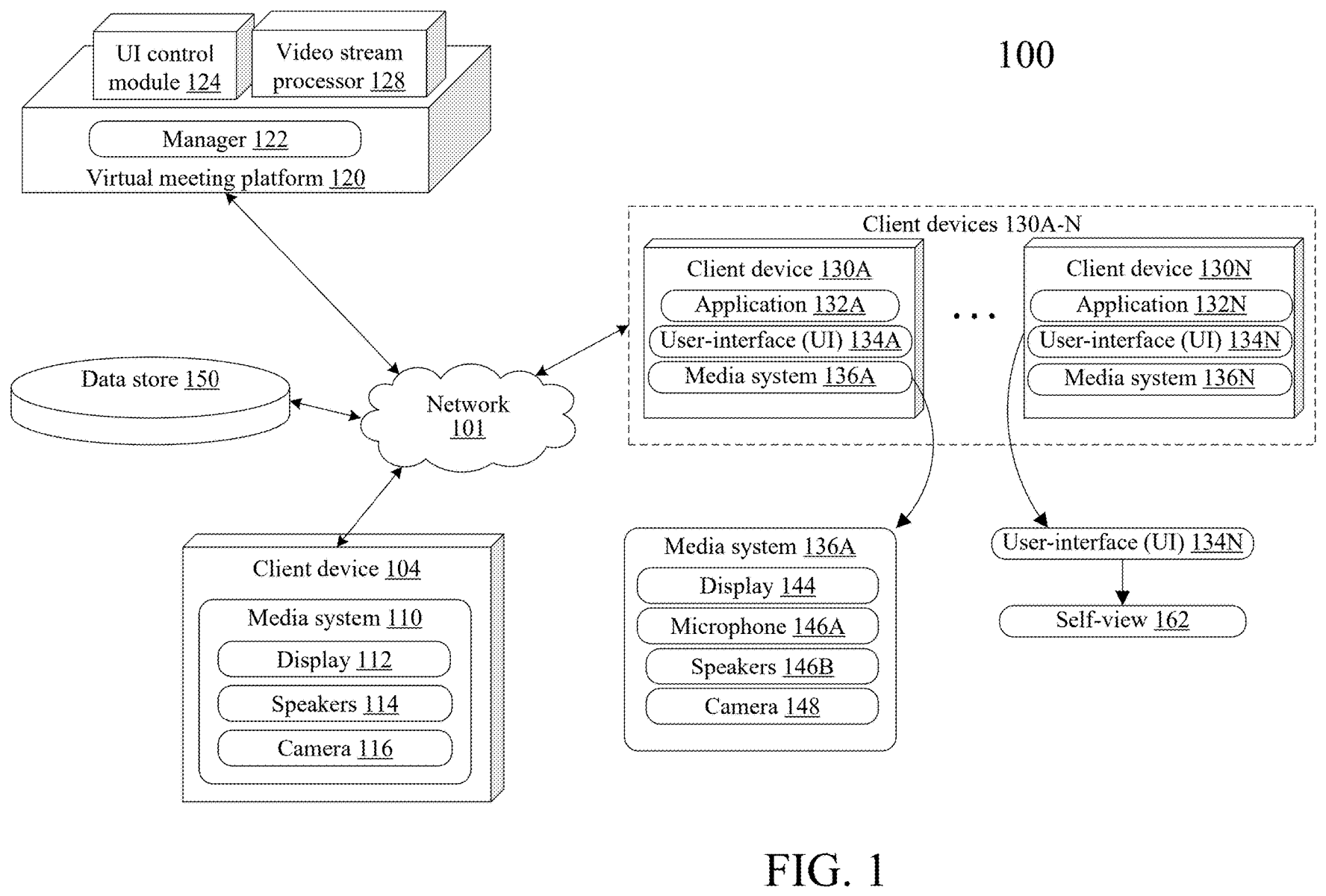

100

Client devices 130A-N

Client device 130N
Application 132N
User-interface (UI) 134N
Media system 136N

User-interface (UI) 134N
Self-view 162

Client device 130A
Application 132A
User-interface (UI) 134A
Media system 136A

Media system 136A
Display 144
Microphone 146A
Speakers 146B
Camera 148

Network 101

Video stream processor 128
UI control module 124
Manager 122
Virtual meeting platform 120

Data store 150

Client device 104
Media system 110
Display 112
Speakers 114
Camera 116

UNOBTRUSIVE SELF-VIEW FOR VIRTUAL MEETINGS

TECHNICAL FIELD

The instant specification generally relates to virtual meetings, and more specifically to presenting a mini self-view within a virtual meeting session.

BACKGROUND

Virtual meetings have transformed the way businesses and individuals communicate, particularly in the contemporary digital age. Such meetings, often facilitated by cutting-edge technologies, offer a platform through which multiple participants can seamlessly share audio and video streams together, in real-time. This real-time data sharing improves the quality of communication and fosters a collaborative environment, bridging the gap created by physical distances and ensuring a cohesive experience shared by all.

Among the most prominent features of a virtual meeting are the concurrent views of video streams of each participant, alongside any shared content or presentations. This can include a "self-view," or a meta-display of the immediate video stream being transmitted from a user's own client device. A self-view acts as a mirror corresponding to a user's broadcasted video stream. A self-view can allow a user to inspect and manage their video, and self-presentation, as it is being broadcasted to other user's connected to the virtual meeting.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In some aspects, a method is provided. In some aspects, the method includes receiving, by a processing device, a self-view video stream including a self-view of a user of a client device participating in a virtual meeting. In some aspects, the video stream is being acquired by a camera of the client device. In some aspects, the method also includes causing the self-view video stream to be presented in a first self-view portion incorporated into a graphical user interface (GUI) control panel of a GUI displayed on the client device of the user, the GUI control panel including a first GUI control element to control the camera, receiving, via the GUI, a switch self-view command of the user and, responsive to receiving the switch self-view command, causing the self-view video stream to be presented in a second self-view portion located outside of the GUI control panel of the GUI displayed on the client device of the user.

In some aspects, the GUI control panel further includes a second GUI control element to control a microphone of the client device.

In some aspects, the second self-view portion is located in a visual extension of the GUI control panel.

In some aspects, the method further includes receiving a command to switch the self-view to a grid mode and, responsive to receiving the command to switch the self-view to the grid mode, rendering, in the GUI displayed on the client device of the user, the self-view video stream in a third self-view portion located in a grid view of video streams transmitted by client devices of other participants of the virtual meeting.

In some aspects, the second self-view portion is located in a grid view of video streams transmitted by client devices of other participants of the virtual meeting.

In some aspects, the method further includes receiving a mute camera command initiated via the first GUI control element and, responsive to receiving the mute camera command, rendering an avatar of the user in the first self-view portion.

In some aspects, the first self-view portion is visually associated with the first GUI control element that includes a pictogram identifying a state of the camera. In some aspects, the state of the camera is represented by one of: a mute state or an active state.

In some aspects, a system is provided. In some aspects, the system includes a memory device and a processing device communicatively coupled to the memory device. In some aspects, the processing device is to receive, by a processing device, a self-view video stream comprising a self-view of a user of a client device participating in a virtual meeting. In some aspects, the video stream is being acquired by a camera of the client device. In some aspects, the processing device is to cause the self-view video stream to be presented in a first self-view portion incorporated into a graphical user interface (GUI) control panel of a GUI displayed on the client device of the user, the GUI control panel including a first GUI control element to control the camera, receive, via the GUI, a switch self-view command of the user and, responsive to receiving the switch self-view command, cause the self-view video stream to be presented in a second self-view portion located outside of the GUI control panel of the GUI displayed on the client device of the user.

In some aspects, the GUI control panel further includes a second GUI control element to control a microphone of the client device.

In some aspects, the second self-view portion is located in a visual extension of the GUI control panel.

In some aspects, the processing device is further to receive a command to switch the self-view to a grid mode and, responsive to receiving the command to switch the self-view to the grid mode, render in the GUI displayed on the client device of the user, the self-view video stream in a third self-view portion located in a grid view of video streams transmitted by client devices of other participants of the virtual meeting.

In some aspects, the second self-view portion is located in a grid view of video streams transmitted by client devices of other participants of the virtual meeting.

In some aspects, the processing device is further to receive a mute camera command initiated via the first GUI control element and, responsive to receiving the mute camera command, render an avatar of the user in the first self-view portion.

In some aspects, the first self-view portion is visually associated with the first GUI control element that includes a pictogram identifying a state of the camera. In some aspects, the state of the camera is represented by one of: a mute state or an active state.

In some aspects, a non-transitory computer readable storage medium including instructions that, when executed by a processing device, causes the processing device to perform operations is provided. In some aspects, the operations include receiving, by the processing device, a self-view video stream including a self-view of a user of a client device participating in a virtual meeting. In some aspects, the video stream is being acquired by a camera of the client device. In some aspects, the operations further include causing the self-view video stream to be presented in a first self-view portion incorporated into a graphical user interface (GUI) control panel of a GUI displayed on the client device of the user, the GUI control panel including a first GUI control element to control the camera, receiving, via the GUI, a switch self-view command of the user and, responsive to receiving the switch self-view command, causing the self-view video stream to be presented in a second self-view portion located outside of the GUI control panel.

In some aspects, the GUI control panel further includes a second GUI control element to control a microphone of the client device.

In some aspects, the second self-view portion is located in a visual extension of the GUI control panel.

In some aspects, the operations further include receiving a command to switch the self-view to a grid mode and, responsive to receiving the command to switch the self-view to the grid mode, rendering, in the GUI displayed on the client device of the user, the self-view video stream in a third self-view portion located in a grid view of video streams transmitted by client devices of other participants of the virtual meeting.

In some aspects, the second self-view portion is located in a grid view of video streams transmitted by client devices of other participants of the virtual meeting.

In some aspects, the operations further include receiving a mute camera command initiated via the first GUI control element, and responsive to receiving the mute camera command, rendering an avatar of the user in the first self-view portion.

BRIEF DESCRIPTION OF THE DRAWINGS

Aspects and embodiments of the present disclosure will be understood more fully from the detailed description given below and from the accompanying drawings of various aspects and embodiments of the disclosure, which, however, should not be taken to limit the disclosure to the specific aspects or embodiments, but are for explanation and understanding only.

FIG. 1 illustrates an example system architecture capable of supporting presentation of a self-view during a virtual meeting, in accordance with one embodiment of the present disclosure.

DETAILED DESCRIPTION

Figure 2:
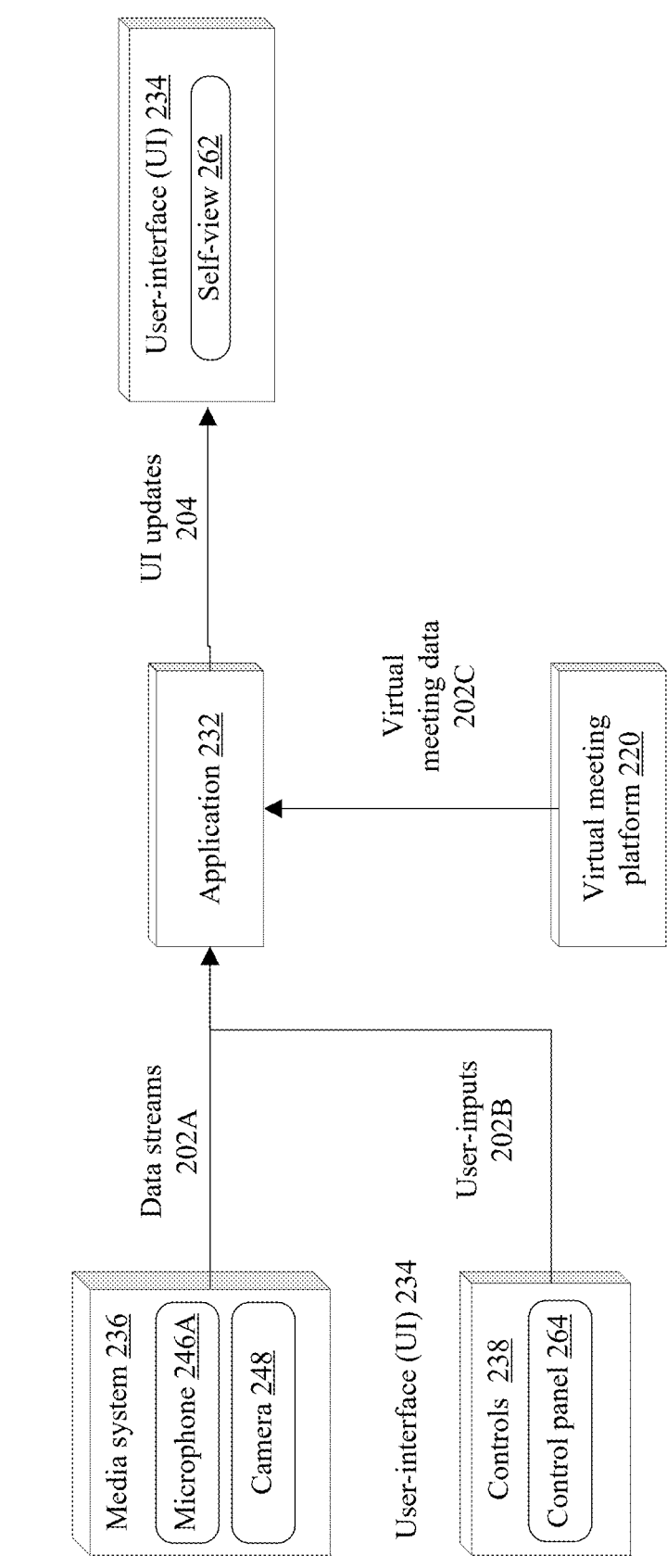
FIG. 2 illustrates a process for generating and managing a self-view within a user interface (UI) of a virtual meeting, according to some embodiments of the present disclosure.

The "self-view" function found in many virtual meetings (at times herein referred to as "virtual meetings") UIs has been developed to cater to the participants' need to see their own video feed during meetings. This feature plays an instrumental role in ensuring that users maintain a professional demeanor throughout the meeting. By displaying one's own video, participants can constantly monitor and adjust aspects such as their camera positioning, lighting, and overall appearance, ensuring they present themselves properly throughout a virtual meeting. Modem virtual meeting platforms often display the self-view as a window within a larger meeting interface.

Despite its merits, the current implementations of the self-view function have their own set of challenges. A noticeable issue is its potential to be a distracting element within the meeting interface. Users, conscious of their appearance, might find themselves frequently checking this feed. Moreover, if not managed appropriately, the self-view window might overlap or obstruct other essential UI elements, resulting in the unnecessary consumption of computing resources and hampering the overall meeting experience.

A deeper psychological impact of the self-view feature is its potential to diminish user engagement in virtual meetings. The constant availability and display size of one's own video feed can inadvertently shift the focus from the meeting's content to one's own appearance. This excessive focus can lead to decreased attention spans and increased fatigue, often termed "Zoom fatigue". This phenomenon, stemming from excessive video meetings and the associated cognitive load, underscores the need to use self-view judiciously and highlights the broader challenges of virtual interactions.

Aspects and implementations of the present disclosure address the above and other challenges of modern virtual meetings by providing systems and techniques that can generate and present a self-view to a user using different modes. A self-view can refer to a visual item presenting a video stream generated by a camera of the user's client device (self-view video stream). The modes for presenting the self-view may include a miniaturized self-view mode (using the smallest visual item), a grid self-view mode (using the visual item of the size that is similar to the size of visual items corresponding to video streams of other participants), or an overlay self-view mode (using a medium-size view that is larger than the miniaturized self-view but smaller than the grid self-view). In a miniaturized self-view mode, the self-view can be included in a control panel of a virtual meeting UI and can be associated with a control to switch to a different self-view mode (e.g., an overlay self-view mode or a grid self-view mode) when requested by the user. The miniaturized self-view mode can provide confirmation that the user's video stream is presented while reducing the user's focus from the meeting's content to their own appearance and thereby reducing "Zoom fatigue." If the user needs to check their background or appearance (e.g., hair), the user can easily switch to the overlay self-view mode (e.g., by hovering over the miniaturized self-view), which presents the user's self-view in a larger size and can be available as long as needed (e.g., can be switched back when the hovering over the miniaturized self-view ends). If the user would like to ensure that the user is well represented among other participants in the virtual meeting UI, the user can switch to the grid self-view mode, which presents the visual item corresponding to the user's video stream along with (and using the same size as) visual items corresponding to video streams of other participants of the virtual meeting. Providing the above options for presenting the user's self-view can seek to strike a balance between subtlety and utility, offering varying levels of self-inspection, video stream details, and spatial dimensions.

Aspects of the present disclosure provide technical advantages over previous solutions. Aspects of the present disclosure can provide an additional functionality to a virtual meeting platform by providing various options on how to present a self-view during a virtual meeting, including the use of a mini self-view that can be easily accessed during the virtual meeting. This functionality results in better use of screen space, which can be especially important for small-screen devices such as smart phones, and in more efficient use of processing resources needed to present a self-view of a smaller size, thereby resulting in an increase of overall efficiency and a decrease in potential latency of the virtual meeting platform. This also results in improved user experience by reducing fatigue and possible discomforts, while improving user participation.

It can be noted that various aspects of the above referenced methods and systems are described in detail herein below by way of example, rather than by way of limitation. The embodiments and examples provided below can reference video streams for the purpose of simplicity and brevity only. However, embodiments and examples of the present disclosure can be applied to media items generally and can be applied to various types of content or media items, including for example images, videos, etc. Further, embodiments and examples provided below can describe a video stream that is provided in real time (e.g., live streaming).

FIG. 1 illustrates an example system architecture capable of supporting a self-view during a virtual meeting, in accordance with one embodiment of the present disclosure.

The system architecture 100 (also referred to as "system" herein) may include a virtual meeting platform 120, client devices 130A-N, one or more client devices 104, and a data store 150, each connected to a network 101. In some embodiments, virtual meeting platform 120, client devices 130A-N, one or more client devices 104, and/or data store 150, can be, or can otherwise be connected to one or more computing devices (such as a rackmount server, a router computer, a server computer, a personal computer, a main-frame computer, a laptop computer, a tablet computer, a desktop computer, etc.), one or more storage devices (e.g., hard disks, memories, databases), networks, software components, and/or hardware components capable of connecting to system 100.

In some embodiments, network 101 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 150 is a persistent storage that is capable of storing data as well as data structures to tag, organize, and index the data. A data item can include audio data and/or video stream data, in accordance with implementations described herein. Data store 150 can be hosted by one or more storage devices, such as main memory, magnetic or optical storage-based disks, tapes or hard drives, NAS, SAN, and so forth. In some implementations, data store 150 can be a network-attached file server, while in other implementations data store 150 can be some other type of persistent storage such as an object-oriented database, a relational database, and so forth, that can be hosted by virtual meeting platform 120 or one or more different machines coupled to the virtual meeting platform 120 via network 101. In some implementations, data store 150 can store portions of audio and video streams received from the client devices 130A-N for the virtual meeting platform 120. Moreover, the data store 150 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 130A-N and/or concurrently editable by the users.

A virtual meeting platform 120 can enable virtual meetings between multiple participants via respective client devices that are connected over a network and share each other's audio (e.g., voice of a user recorded via a microphone of a client device) and/or video streams (e.g., a video captured by a camera of a client device) during a virtual meeting. A virtual meeting (e.g., video-based conference, video chat, teleconference, web meeting, etc.) refers to a real-time communication session such as a virtual meeting call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Virtual meeting platform 120 can allow a user to join and participate in a virtual meeting call with other users of the platform. In some instances, a virtual meeting platform can enable a significant number of client devices (e.g., up to one hundred or more client devices) to be connected via the virtual meeting. In some embodiments, virtual meeting platform 120 hosts a virtual meeting manager 122, a video stream processor 128, and a user-interface (UI) controller 124. Video stream processor 128 can receive video streams from the client devices (e.g., from client devices 130A-N and/or 104). Video stream processor 128 can determine visual items for presentation in the UI (e.g., the UIs 134-N) during a virtual meeting. Each visual item can correspond to a video stream from a client device (e.g., the video stream pertaining to one or more participants of the virtual meeting) and can refer to a UI element that occupies a particular region in the UI and is dedicated to presenting a video stream from a respective client device. Such a video stream can depict, for example, a user of the respective client device while the user is participating in the virtual meeting (e.g., speaking, presenting, listening to other participants, watching other participants, etc., at particular moments during the virtual meeting), a physical conference or meeting room (e.g., with one or more participants present), a document or media content (e.g., video content, one or more images, etc.) being presented during the virtual meeting, etc. In some implementations, the video stream processor 128 can receive audio streams associated with the video streams from the client devices (e.g., from an audiovisual component of the client devices 130A-N). Once the video stream processor 128 has determined visual items for presentation in the UI, the video stream processor 128 can notify the UI controller 124 of the determined visual items. The visual items for presentation can be determined based on current speaker, current presenter, order of the participants joining the virtual meeting, list of participants (e.g., alphabetical), etc.

UI controller 124 can provide the UI for a virtual meeting. The UI can include multiple regions. Each region can display a video stream pertaining to one or more participant of the virtual meeting. UI controller 124 can control which video stream is to be displayed by providing a command to the client devices that indicates which video stream is to be displayed in which region of the UI (along with the received video and audio streams being provided to the client devices). For example, in response to being notified of the determined visual items for presentation in the UI 134A-N, UI controller 124 can transmit a command causing each determined visual item to be displayed in a region of the UI and/or rearranged in the UI.

Additionally, the UI controller 124 can adapt the interface based on the capabilities of client devices. In such a way the UI controller 124 can provide a fluid and responsive interactive experience for users of the virtual meeting platform. Further features and embodiments of UIs generated and/or provided by the UI controller 124 will be further described with respect to FIGS. 3-5.

In some implementations, virtual meeting manager 122 is configured to manage a virtual meeting between multiple users of virtual meeting platform 120. In some implementations, virtual meeting manager 122 can provide the UIs 134A-N to each client device to enable users to watch and listen to each other during a virtual meeting. Virtual meeting manager 122 can also collect and provide data associated with the virtual meeting to each participant of the virtual meeting. In some implementations, virtual meeting manager 122 can provide the UIs 134A-N for presentation by client application 132A-N. For example, the UIs 134A-N can be displayed on a display device 144A-N by client application 132A-N executing on the operating system of the client device 130A-N or the client device 104. Virtual meeting manager 122 can also modify the quality of video streams in response to changes in network conditions e.g., bandwidth fluctuations, or client device capabilities, to maintain stable and high-quality video streams and overall system functionality. Depending on the network conditions and capabilities of each client device, different versions of the same video stream, encoded at different bitrates or resolutions, may be sent to different devices to ensure the best possible video quality for each client device.

Client devices 130A-N can each include computing devices such as personal computers (PCs), laptops, mobile phones, smart phones, tablet computers, netbook computers, network-connected televisions, etc. In some implementations, client devices 130A-N can also be referred to as "user devices." Each client device 130A-N can include a display device 144A-N to present UI 134A-N and an audiovisual component that can generate audio and video data to be streamed to virtual meeting platform 120. In some implementations, the audiovisual component can include a device such as microphone 146A-N to capture an audio signal representing speech of a user and generate audio data (e.g., an audio file or audio stream) based on the captured audio signal. The audiovisual component can also include speaker 146A-N to output audio data to a user associated with a particular client device 130A-N. In some implementations, the audiovisual component can also include an image capture device such as camera 148A-N to capture images and generate video data (e.g., a video stream) of the captured data of the captured images.

In some implementations, virtual meeting platform 120 is coupled, via network 101, with one or more client devices 104 that are each associated with a physical conference or meeting room. Client device(s) 104 can include or be coupled to a media system 110 that can comprise one or more display devices 112, one or more speakers 114 and one or more cameras 116. Display device 112 can be, for example, a smart display or a non-smart display (e.g., a display that is not itself configured to connect to network 101). Users that are physically present in the room can use media system 110 rather than their own devices (e.g., client devices 130A-N) to participate in a virtual meeting, which can include other remote users. For example, the users in the room that participate in the virtual meeting can control the display 112 to show a slide presentation or watch slide presentations of other participants. Sound and/or camera control can similarly be performed. Similar to client devices 130A-N, client device(s) 104 can generate audio and video data to be streamed to virtual meeting platform 120 (e.g., using one or more microphones, speakers 114 and cameras 116). Each client device 130A-N or 104 can include client application 132A-N, which can be a mobile application, a desktop application, a web browser, etc. In some implementations, client application 132A-N can present, on a display device 144A-N of client device 130A-N, a user interface (UI) (e.g., a UI of the UIs 134A-N) for users to access virtual meeting platform 120. For example, a user of client device 130A can join and participate in a virtual meeting via a UI 134A presented on the display device 144A by client application 132A. A user can also present a document to participants of the virtual meeting via each of the UIs 134A-N. Each of the UIs 134A-N can include multiple regions to present visual items corresponding to video streams of the client devices 130A-N and 104 provided virtual meeting platform 120 for the virtual meeting.

As will be discussed further below, in embodiments, the video stream captured from camera 148, may be presented to a user of client device 130 in UI 134 as a self-view. As discussed above, a self-view refers to a visual item presenting a video stream generated by the user's client device 130 (self-view video stream). In embodiments, such a self-view (e.g., self-view 162) may be displayed to the user using different, selectable modes. For instances, in embodiments, self-view 162 may be presented using a miniature self-view mode (to present the smallest visual item), a grid self-view mode (to present the visual item of the size that is similar to the size of visual items corresponding to video streams of other participants), or an overlay self-view mode (to present a medium-size view that is larger than the miniature self-view but smaller than the grid self-view). Such modes will be discussed below (and further with respect to FIGS. 3-5).

In some embodiments, client applications 132A-N can receive input from users through UIs 134A-N of any of the client devices. In one example, a user of client device can provide input (e.g. a user query, control commands, etc.) using UI elements of UIs 134A-N such as buttons, text-entry spaces, selection lists, drop-down lists, control panels, etc. As will be further described below (and with respect to FIGS. 3-5), UI 134A-N may allow a user to switch between different self-view modes.

In embodiments, self-view 162 may provide the user of a client device with a real-time display of their own video feed as captured by a camera associated with their client device. Such a self-view may present many benefits. For example, such a self-view may allow the user to see what they look like to other participants in the virtual meeting, make adjustments, such as altering the camera angle or lighting conditions, and may generally be an added form of engagement and participation associated with a virtual meeting.

In embodiments, client application 132A may capture data (e.g., video data) for the self-view 162 by executing specific protocols or subroutines that direct the capture and/or storage of the video data. Such a process will be further described with respect to FIG. 2. In embodiments, upon capture, a copy of the video data may be directed to self-view 162 for immediate display to a user. In embodiments, a display of the client device may render video data as a self-view 162 on a portion of the display screen, alongside other meeting-related graphical UI elements. In embodiments, the self-view 162 may be generated and managed in real-time, providing continuous feedback to the user throughout the duration of the virtual meeting. In some embodiments, a user of the system may designate their self-view video stream to be displayed using a miniature self-view mode, an overlay self-view mode, or even a grid self-view mode in the main region for displaying video streams (shown in FIG. 3). In some embodiments, these options may correspond to different overall areas, or sizes, or perceptible levels of video data of the self-view video. For example, in embodiments, the video stream associated with the self-view may be a combination or amalgamate of visual data corresponding, or influenced, from a variety of real-world presentation elements. Such real-world presentation elements and their associated characteristics can be vast, and range from smaller, and finer objects and elements, to larger elements. Such real-world presentation elements may include anything that might be captured via the camera of the media system, and input into the self-view video stream. The perceptibility of such elements within the self-view video stream may depend on several factors, including the spatial dimensions of the video stream as it is displayed.

In embodiments, the visual data captured as the self-view video stream may correspond to the above-mentioned real-world presentation elements, and may be categorized into micro, meso, and macro-level visual data. These categories may correspond to varying levels of perceptibility. For example, in embodiments where the spatial dimensions of a video stream are reduced (e.g., such that the video stream is visually very small), only the macro-level visual data may be perceptible from a video. In embodiments, that are somewhat spatially larger, both macro and meso-level visual data (and corresponding characteristics) may be perceptible. In even larger, or unreduced spatial dimension versions of the video stream all, or a majority of visual data may be perceptible. In embodiments this may include all categorized macro, micro, and meso-level visual data.

Common real-world presentation elements, by way of example, that may be associated with a self-view video stream, may include, but is not limited to, a user's hair, clothes, body contours, and objects within the video frame or field of view. Such objects may include any background items, and may encompass objects such as household items, items within a conference room or office, or even outdoor items, and landscapes, etc. Characteristics may also be present or perceptible from the visual data corresponding to the previous elements, such as their orientations, or positions, or finer qualities associated with each element. As such, the above list of capturable real-world presentation elements and characteristics may continue and extend to almost any object and/or characteristic that may be captured by the camera.

As discussed, the real-world presentation elements may be captured, or correspond to visual data that is combined, coalesced, or amalgamated within a video stream. This individual visual data of the video stream may be categorized within different levels and categories of perceptibility, which may correlate with certain spatial dimensions of a video stream. For example, in the smaller sized or spatial dimensions of a video stream, the micro-level and meso-level video data within the video stream may be unable to be perceived from a video stream with such small dimensions. In large spatial dimensions or sizes of a displayed video stream, more and finer levels of visual data may be visible. It should be noted that the above three categorized are a simplified version of the possible categorizations of visible data, and as many different spatial dimensioning and configurations are possible for displaying a video stream, so too will be the amount of perceptible visual data within the video stream.

In some embodiments, meso-level video data may correspond to real-world presentation elements such as large text on documents and clothes, and smaller size physical objects such as pencils, phones, etc., and may not be visible or perceptible at video spatial dimensions intended for viewing the macro-level of video (e.g., visual) data. In embodiments, the micro-level of video data may correspond to real-world presentation elements such as fine text, position and orientation of strands of hair, spots of dirt on a jacket, etc. Such elements may also not be visible or perceptible at video spatial dimensions intended for viewing the macro-level of visual data, such as when a displayed video is very small. In contrast to the above two examples, macro-level video or visual data may correspond to real-world presentation elements that may be larger than the above examples. Such visual data may correspond to larger elements such as a user's overall contours, a user's positioning with respect to the camera's field of view, a background that is behind the user, and overall image lighting, etc. These elements may be perceivable from visual data of a video stream with even the smallest or smaller dimensions. Further characteristics that may be extracted or perceived from macro-level visual data may include overall shapes, or major contours, primary colors, large objects, dominant lines, outline features, etc.

Thus, each possible display mode or option may have different spatial dimensions, and different levels of perceivable visual data that allows perception of real-world elements at different capacities. Each display option may also correspond to additional strengths, or weaknesses. For example, displaying the self-view video in the smallest display (e.g., miniature self-view), might indicate that the self-view video content is the least obtrusive to a user of the device. At the same time, such a small window for display may only allow a user of the device to recognize or perceive macro-level visual data and associated characteristics associated with the self-view. In some embodiments, this spatial dimensioning may be preferred and may be the default setting of the system.

While the spatial size of the largest display option (e.g., placing the self-view in grid self-view, alongside the meeting participant video streams) may allow for additional or unobstructed intake of visual data (e.g., all of micro, macro, and meso-level visual data may be perceivable), such a self-view dimensions may make the content obtrusive (and in some embodiments, may be the default setting of the self-view video stream), the same limited spatial size may mean that the human eye of a viewer may only be able to capture large elements or macro-level visual data within the self-view.

In embodiments, the overlay self-view may provide middle term, or middle space between the above-mentioned smallest display spatial dimensioning and largest display spatial dimensioning. Considering the previous discussion, the overlay self-view may be slightly more obtrusive and distracting than the smallest display setting, but on the other hand, may provide additional data, for example meso-level video data may be perceptible from the video stream, given it's added space and dimension. This option will be described further with respect to FIG. 5.

In some embodiments, each option aligns with different levels of the trade-off between how large the self-view video display is, and how much information (e.g., macro, meso, and micro-levels of video data) may be able to be perceived from the video stream. As mentioned, a goal of the self-view video stream is to be as unobtrusive (e.g., as small in dimensions) as possible, while still providing insight into the large, macro-level details of the video data and corresponding real-world. In some embodiments, the smallest self-view window and spatial dimensions, e.g., self-view 162, may be the default viewing setting for the system (in embodiments this may be changed through an UI element or control).

In some embodiments, client application 152 may pre-establish dimensions for the options for size and space in which to display the self-view video stream. In alternate embodiments, they may be adjusted by a user of the client device.

In some embodiments, the system can include varying options, and adaptability for displaying the self-view. In addition, the transitions may be temporal. For example, should a presenter feel an imperfection, such as a hair out of place, or a bug on their head etc., they may quickly transition to any of the viewing size options providing enough information to analyze such an imperfection (e.g., the overlay element, or the common video stream size). After perceiving and fixing the imperfection, either by adjust one's hair, swatting at a fly, etc., the system can automatically, or otherwise be prompted to return to a less obtrusive and information display setting. This added controllability allows users to access the benefits they need, when they need them, and return to more optimal configurations after such a need has passed.

In general, functions described in embodiments as being performed by platform 120 may also be performed by client devices (e.g. client device 130). In addition, the functionality attributed to a particular component may be performed by different or multiple components operating together. Platform 120 may also be accessed as a service provided to other systems or devices through appropriate application programming interfaces, and thus is not limited to use in websites.

It is appreciated that in some implementations, platform 120 or client devices of the system (e.g. client device 130) may each include an associated API, or mechanism for communicating with APIs. In such a way, any of the components of system 100 may support instructions and/or communication mechanisms that may be used to communicate data requests and formats of data to and from any other component of system 100, in addition to communicating with APIs external to the system (e.g., not shown in FIG. 1).

In some embodiments of the disclosure, a "user" may be represented as a single individual. However, other implementations of the disclosure encompass a "user" being an entity controlled by a set of users and/or an automated source. For example, a set of individual users federated as a community in a social network may be considered a "user."

In another example, an automated consumer may be an automated ingestion pipeline, such as a topic channel.

In situations in which the systems, or components therein, discussed here collect personal information about users, or may make use of personal information, the users may be provided with an opportunity to control whether the system or components collect user information (e.g., information about a user's social network, social actions or activities, profession, a user's preferences, or a user's current location), or to control whether and/or how to receive content from the system or components that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the system and components.

FIG. 2 illustrates a process for generating and managing a self-view within a client device of FIG. 1, according to some embodiments of the present disclosure.

In some embodiments, similar features and components as were described with respect to FIG. 1 may be used in the process 200 illustrated in FIG. 2. For example, process 200 may leverage a media system 236, a microphone 246A, a camera 248, a client application 232, a virtual meeting platform 220, and a UI 234 including a self-view 262. Such elements may correspond, or be similar, to media system 136, microphone 146A, camera 148, client applications 132A-N, virtual meeting platform 120, and UIs 134A-N including a self-view 162 as seen and described in FIG. 1. Accordingly, such features and components as seen and described with respect to FIG. 2, may incorporate and augment at least the corresponding embodiments seen and described with respect to FIG. 1.

In embodiments, a client application of a client device e.g., client application 232, may perform functions to facilitate the capture, processing, and display of audio-visual data to one or more users of the client device. As previously mentioned, in embodiments, application 232 may be executed on various individual, or group, computing devices, such as desktops, laptops, smartphones, or tablets, etc.

As discussed with respect to FIG. 1, in embodiments, client application 232 may interface with a media system 240 of the associated client device to capture data streams 202A. Media system 240 may incorporate a variety of hardware components associated with a client device. Such components may be at least data-capture components such as cameras, microphones, speakers, display screens etc. (e.g., microphone 246A and camera 248). The media system 240, and included data-capture components, may be leveraged by client application 232 to capture at least raw audio-visual data. Such data may then be processed by client application 232 for rendering to a user of the client device through UI 234.

In some embodiments, upon initiation, client application 232 may activate media system 240 to begin the capture of video data. This may be accomplished through the device's camera 248 which may capture visual data in the form of video frames. This may further be accomplished through the device's microphone 246A, which captures audio data. In embodiments, the captured data may be in a raw format, typically comprising high-resolution video frames and uncompressed audio waveforms.

Following capture, the data streams 202A (e.g., video data) may undergo pre-processing. Such pre-processing may occur either within media system 236, or at client application 232. For example, with respect to video data, the pre-processing may include operations such as or similar to, noise reduction, image stabilization for video, echo cancellation for audio, etc. Client application 232 and/or media system 236 may employ built-in models and/or algorithms or leverage device-specific APIs to enhance quality of captured data, prepare such data for encoding, transmission, display, etc.

Following capture of data streams 202A, the data may be transferred to client application 232, which may continuously process received data streams, to facilitate management and presentation of a self-view 262 within a UI 234 of the client device.

In some embodiments, client application 232 may receive further video and audio data, as well as further data associated with a virtual meeting (e.g., virtual meeting data 202C), from virtual meeting platform 220 and/or client devices of other participants of the virtual meeting. In embodiments, client application 232 may aggregate and assemble all transferred data to generate UI 234. In alternate embodiments, the virtual meeting platform may receive video streams from participants of the virtual meeting and provide a UI to each client application for presentation on a respective client device. Depending on commands and/or settings received from the client applications, the virtual meeting platform may provide different UIs to different client devices. For example, client application 232 may request that the self-view video stream transmitted by client application 232 be presented as a miniature self-view in the UI 234. In response to this request, the virtual meeting platform can provide the UI 234 with the miniature self-view to application 232 while providing a UI without a miniature self-view (e.g., with visual items of the same size to present video streams of all participants) to applications of client devices of the other participants of the virtual meeting.

In embodiments, a specific portion of UI 234, hosted by a display of the client device, may include the self-view 260, and may be allocated to display the user's own video feed. Such a UI will be further discussed with respect to FIGS. 3-5 below.

In embodiments where self-view video stream data is retained at the client device, the processing of the data for self-view 260 may be optimized for real-time feedback. For example, instead of being returned from virtual meeting platform 220 through one or more encoding-transmission-decoding cycles, the video data associated with self-view 262 may be directly rendered onto UI 234 (via continuous UI updates 204). As mentioned above, in such embodiments, client application 232 may continuously intake video (or other types of) data, process the data, and continuously generate and update (e.g., via UI updates 204) a UI for display to a user of the virtual meeting. Through such a process, the rendered self-view may provide minimal latency.

In embodiments, client application 232 may incorporate additional functional or aesthetical features within the self-view. For example, interactive overlays, such as mute indicators, connection status, or user-defined tags, customizable backgrounds, video filters, image filters, etc., may be superimposed on the self-view. In embodiments, users might have the capability to resize, reposition, hide, show, or modify, (etc.), the self-view based on their preferences.

In embodiments, the UI 234 may further include UI control elements 238 (e.g., controls) that may (or may not) be part of a control panel 264. These UI elements may be similarly and continuously updated through UI updates 204, as is the self-view. For example, in embodiments, the control panel may include controls such as self-mute, hide, self-view, etc. Upon engagement of a control of the control panel 264 by a user, client application 232 may intake the user-input 202B, and may update the UI 234 including the visual elements of the control panel 264 to indicate a control has been engaged. For example, in embodiments, overlay self-view mode may provide an enlarged, or dynamic, or otherwise altered form of self-view 262 when compared to miniature or grid self-view mode. In embodiments, overlay self-view mode may be selectively engaged by a user, and client application 232 may register such a command and immediately (or nearly immediately) update the UI 234 and self-view 262 to reflect such commands. Such commands, visual elements, and further embodiments of the self-view and its components will be further described below with respect to FIGS. 3-5.

In embodiments, the client application may be pre-equipped with algorithms and processing logic to discern the nature and intent of the received command. For example, as client application 232 is performing continuous processing 2.3, the client application may incorporate the user-inputs within UI updates 204, perform actions, or transmit the user-inputs and/or abstractions or indications to virtual meeting platform 220. For example, in some embodiments, user-inputs 202B may include a command to mute a specific video/audio stream being received from virtual meeting platform, the client application may either mute the audio locally (at the client device), or send instructions to the virtual meeting platform 220 to discontinue the transmission of the audio stream. In some embodiments user-inputs 202B may include a command from a user to mute their own audio. In such cases, application 232 may instruct the associated audio system of media system 236 to cease the transmission of the audio data stream, one of the audio and/or video data streams 202A. Simultaneously, an update associated with such a command may be relayed to both the UI 234 and virtual meeting platform to visually indicate the muted status to all client devices associated with the virtual meeting. In embodiments, this may be accomplished through a graphical icon or change in the audio waveform representation, as will be further discussed with respect to FIGS. 3-5.

One of ordinary skill in the art, having the benefit of this disclosure, will appreciate that many such user-inputs, including variations and combinations that might be associated with a virtual meeting exist. One of ordinary skill in the art, having the benefit of this disclosure, will appreciate that user-inputs 202B may include, but are not limited to, UI changes such as resizing and spatial adjustments, muting audio streams, pausing video streams (including a user's own), uploading documents, sharing one's screen, etc.

Figure 3:
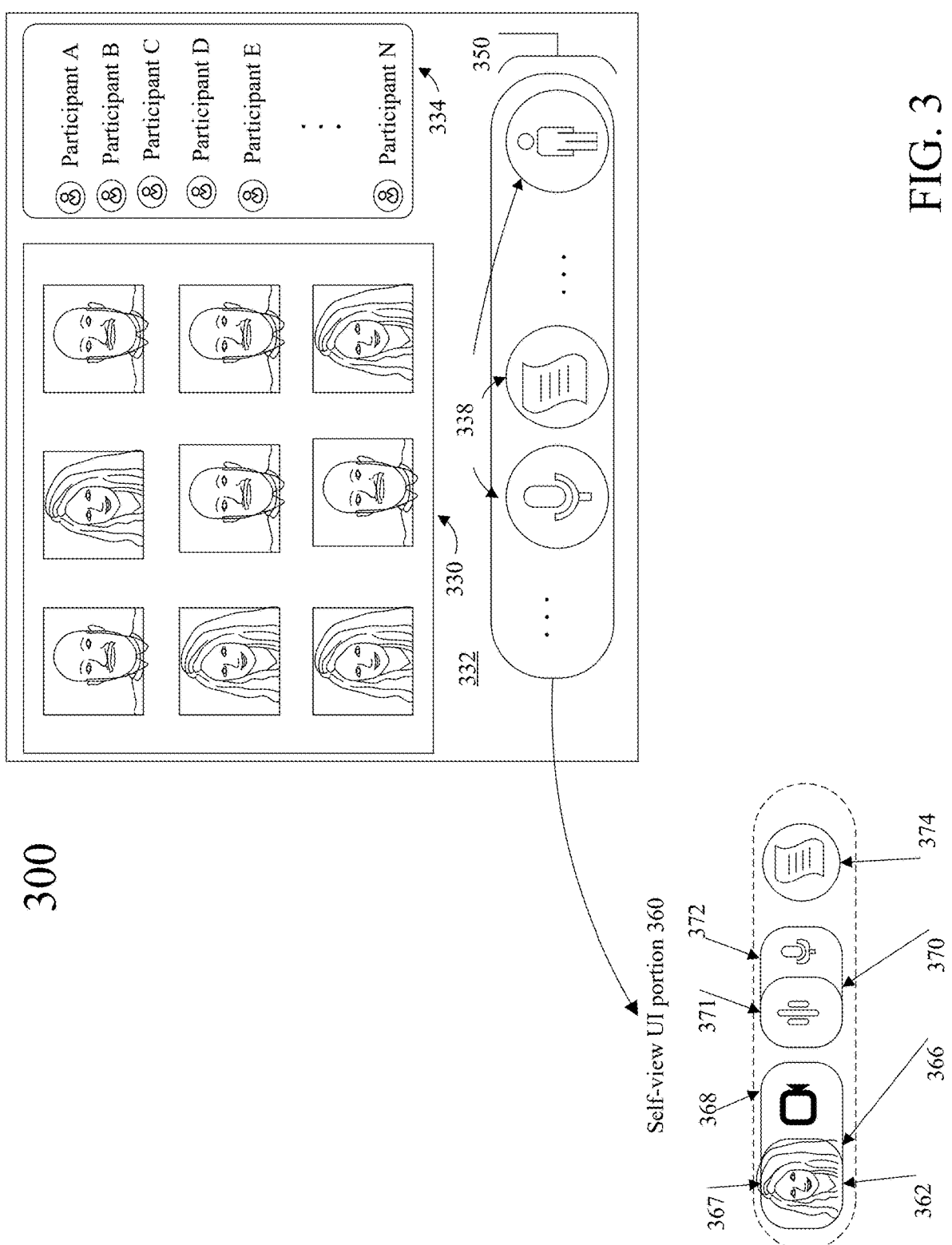
FIG. 3 illustrates an example user interface (UI) including a self-view UI portion, in accordance with some embodiments of the present disclosure.

FIG. 3 illustrates an example user interface (UI) including a self-view UI portion, in accordance with some embodiments of the present disclosure. In some embodiments, similar features and components as were described in with respect to FIGS. 1-2 may be illustrated in FIG. 3. In some embodiments, UI 300 may be created by video streaming platform 120/220 and provided to client application 132A-N/232 as seen in FIGS. 1-2 for presentation on a client device. In other embodiments, UI 300 may be created by client application 132A-N/232 using video streams and other relevant information received from client devices of other participants and/or the video streaming platform. In yet other embodiments, UI 300 may be provided to client application 132A-N/232 by the video streaming platform and updated by client application 132A-N/232 based on the user's inputs, visual and audio data created at the client device, etc. for presentation at the client device. In some embodiments, UI 300 may include visual elements such as self-view 362, control panel 350, and controls 338. Such elements may correspond, or be similar, to self-view 162 and/or 262, control panel 264, and controls 238 as seen and described in FIGS. 1-2.

As previously discussed, in embodiments, a UI of the system may include UI control elements (e.g., buttons and sliders) for controlling various aspects of the virtual meeting. For instance, UI control elements ("controls") such as buttons for muting/unmuting audio of a video, adjusting audio volume, switching video layouts, and other actions, etc., may be included within UI 300.

Visual elements of UI 300 may be arranged or divided into specific regions within a presented UI. For instance, in some embodiments, UI 300 can include a main region (e.g. main region 330) to display a primary area for user viewing, a region 332 below the main region 330, which may hold a virtual meeting control panel 350, and a side region 334 on a right side of the UI, which may hold a participant list for the virtual meeting. One of ordinary skill in the art, having the benefit of this disclosure, will appreciate that numerous layouts and configurations for UI 300 exist, and that UI 300 as seen in FIG. 3 is an exemplary representation of a UI associated with the system.

In embodiments, the main region 330 of the UI 300 may include visual items to present video streams associated with further participants of the virtual meeting. E.g., main region 330 contains nine visual items organized in a grid formation that present video streams associated with the virtual meeting.

In embodiments, region 332 may include a virtual meeting control panel 350 associated with the virtual meeting. As seen in FIG. 3, the virtual meeting control panel 350 may include any number of UI control elements 338 (e.g., to control the camera, to control the microphone, to share a document, to post a text message, etc.).

In some embodiments, the UI 300 may include a miniature self-view UI portion 360 that includes a miniature self-view 362 and a subset of UI control elements 338 of the control panel 350 that is associated with the self-view such as UI camera control element 366, UI microphone control element 370, and document share UI element 374. In the embodiment seen within FIG. 3, the UI camera control element 366 is expanded to include the miniature self-view 362 which is used to present the self-view to a user, in miniature form, and is visually associated with the UI camera control element 366, which may include a pictogram identifying a state of the camera, where the state of the camera can be represented by a mute state or an active state. As illustrated, the self-view UI portion 360 (and therefore miniature self-view 362) can be embedded within the more comprehensive virtual meeting control panel 350, which comprises additional UI control elements 338. In alternate embodiments, self-view UI portion 360 may be separate or separable from virtual meeting control panel 350, and exist within a separate region of the UI (e.g., a region adjacent to the virtual meeting control panel 350). In some embodiments, the self-view UI portion 360 and control panel 364 may be displaceable, to wherever a user of the client device and UI may prefer.

In some embodiments, UI control elements 366, 374, and 370 may correspond to self-video and audio operational controls, e.g., UI control elements 366 and 370 may be on/off controls. In embodiments, UI control element 362 may function as a selector to designate the self-view mode. E.g., UI control element 366 may be activated or engaged by a user to select the miniature self-view mode, the overlay self-view mode (e.g., by hovering over UI control element 366), or the grid self-view mode (e.g., by selecting UI control element 366). In embodiments, enabling the grid self-view mode via UI control element 366 may pause presentation of the self-video stream within miniature self-view portion 360 and enable presentation of the self-view video stream in a visual item alongside visual items presenting other video streams in region 330 of the UI (e.g., in grid self-view mode as previously described). In embodiments, UI control elements 366 and 370 may be or include visual indicators that indicate whether the user's video and/or audio capabilities are enabled. Similarly, UI control element 366 may include visual indicators to indicate which self-view mode is enabled. In embodiments, the UI control element 366 (e.g., self-view 362 specifically) may be activated by a user to switch to or engage in any self-view mode, regardless of which mode is currently enabled. Different types of user input may be required to switch from the miniature self-view mode to the overlay self-view mode and back (via hovering/de-hovering over UI control element 366), from the miniature self-view mode to the grid self-view mode and back (via selecting/de-selecting UI control element 366 using a single click), and from the overlay self-view mode to the grid self-view mode and back (via selecting/de-selecting UI control element 366 using a double click). In alternate embodiments, an additional UI control element (not shown) may be designated to enable switching between different self-view modes and presented in association with UI control element 366 (e.g., included in self-view UI portion 360).

In some instances, the visual indicators may be included within sliding buttons, such that when the button is activated or deactivated, a face of the button slides from a first side to a second side. In some embodiments, the buttons may slide from left to right when a feature or capability is deactivated. In other embodiments, the buttons may slide from right to left, vertically, or in any direction to indicate a change in operational status. In alternate embodiments, different types of buttons, including, but not limited to, light-up indicators, text-based indicators (e.g., text saying "on" or "off"), haptic or tactile feedback (e.g., vibration of the client device), buttons associated with audio indicators (e.g., an audible noise such as the word "on" is heard), dynamic visual indicators (e.g., video indicators, translating indicators, or visually morphing, or changing, indicators, etc.) may be used. In some embodiments, any combination of such or similar, or any feasible operational status indicator may be used.

In embodiments, miniature self-view 362 of the miniature self-view UI portion 360 may be incorporated within the control panel, within a UI element, and/or within UI control element 366 specifically. As previously mentioned, miniature self-view UI portion 360 may incorporate miniature self-view 362, and miniature self-view 362 may provide a user with a real-time, visual feedback of their own video stream. Accordingly, within UI 300 and UI control element

366, miniature self-view 362 may be dynamic, and in embodiments may be a real-time video of the user of the device.

In embodiments, when a user input to the UI control element 366 involves pausing one's own video (e.g., through manually clicking, or tapping with a finger, on the spatial location of UI control element 366), the UI may be updated. In some embodiments, the UI may be updated by sliding the anterior portion 367 of UI control element 366 (e.g., the portion displaying the self-view which is to the left) to a right most location (e.g., obscuring posterior portion 368 of UI control element 366), obscuring the camera indicator on the posterior portion 368. Such a movement will be further seen and described with respect to FIGS. 4A-C.

To produce such a visual effect, as was described with respect to FIG. 2, a client application (not show in FIG. 3) associated with the UI may receive the user-input via UI control element 366. In some embodiments, upon receiving the input, the client application providing the UI 300 may proceed to halt the transmission of the corresponding video data stream as well as update self-view 362 by overlaying a paused icon over the video feed, to indicate the operational status. In some embodiments, the client application (or other application or module providing the UI) may overlay the video feed with a paused icon that is a still image or an avatar of the user. In other embodiments, the video feed of self-view 362 may be overlayed with any still image, or visual indicator indicative of the paused, or inactive operational status (e.g., a pause icon may be overlayed over the video feed, an X may be overlayed over the video feed, etc.). In some embodiments, instead, or in combination with, a visual overlay, the video feed may be modified through filtering, fading, visual dimming, or any other effect that might be associated with or indicate the inactive status the video feed. In some embodiments, further refinement of self-view 362 based on user inputs may include interactive elements like pop-up notifications, tooltips, haptic feedback mechanisms, etc. Through such embodiments, UI 300 and self-view UI portion 360 may present an unobtrusive form of a user's self-view, as well as poignantly indicate the operational status of a user's own video.

In a similar manner, and incorporating any to all of the embodiments described with respect to UI control element 366, UI control element 370 may similarly display the operational status of a user's audio feed. As seen in FIG. 3, in embodiments, UI control element 370 may also include a sliding button. On the left (e.g., anterior portion 371), the unlabeled three bars may dynamically move, stretching in the vertical direction in tandem or reflective of the acoustic features and levels associated with the user's audio feed. In some embodiments, disabling the audio feed may slide the button including the three bars to the right (e.g., obscuring the posterior portion 372), and the dynamism of the visual indicator may be paused (e.g., the three bars may stop moving). As described with respect to UI control element 366, a variety of different, or combination of such, visual or other indicators may be used to indicate the operational status. Further embodiments of such will be described with respect to FIGS. 4-5.

Figures 4A, 4B, 4C:
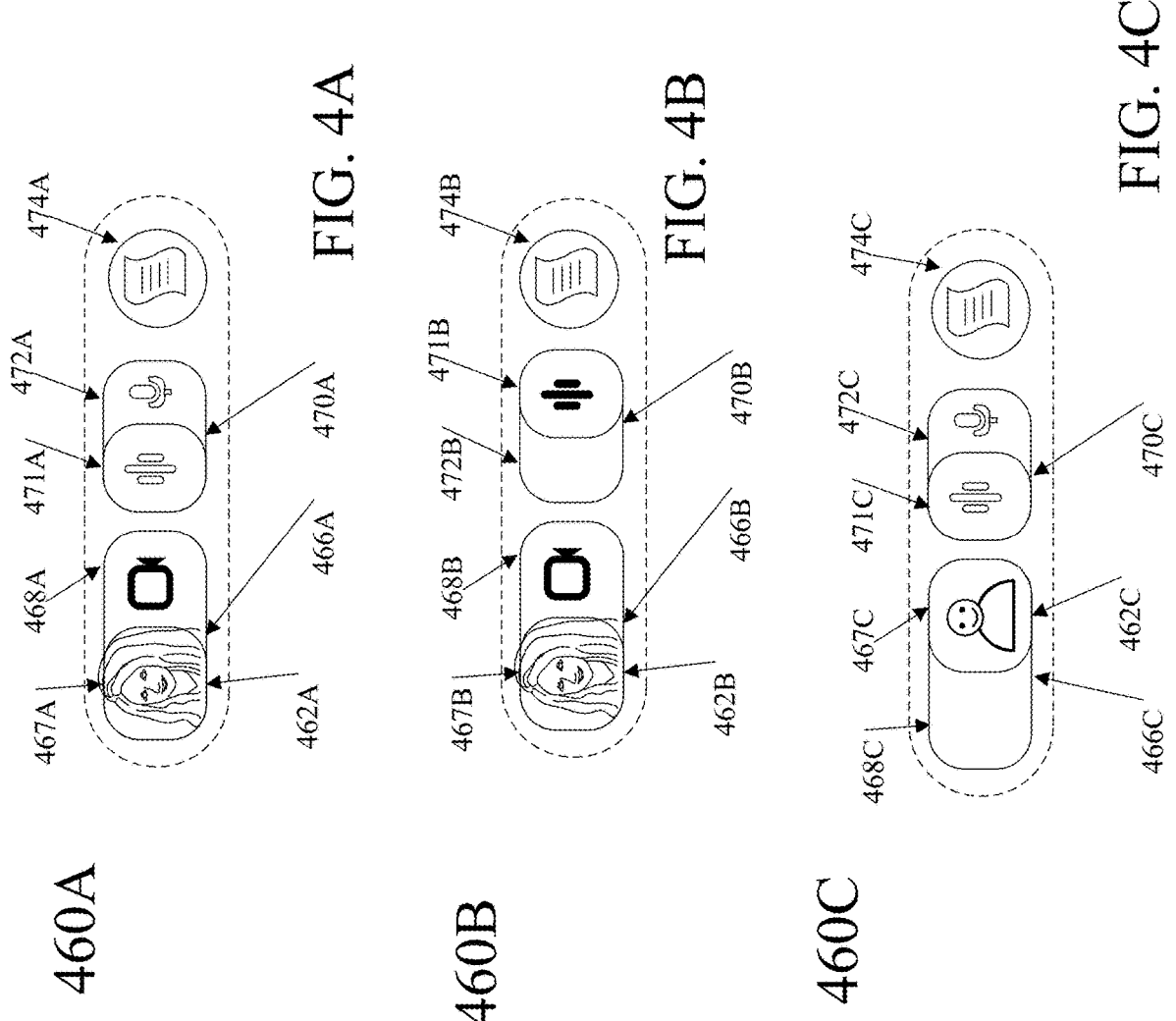
FIG. 4A illustrates an example self-view UI portion, in accordance with some embodiments of the present disclosure.
FIG. 4B illustrates an example self-view UI portion, in accordance with some embodiments of the present disclosure.
FIG. 4C illustrates an example self-view UI portion, in accordance with some embodiments of the present disclosure.

FIGS. 4A-C illustrate example embodiments of the self-view UI portion. Within FIGS. 4A-C, various configurations of the self-view UI portion of FIG. 1 are shown, corresponding to various configurations of the operational status of a user's video and audio feeds.

In some embodiments, similar features and components as were described with respect to FIGS. 1-3 may be illustrated in FIG. 4A-C. For example, FIGS. 4A-C may include miniature self-view UI portions 460A-C, miniature self-views 462A-C, and UI control elements 466A-C, 474A-C, and 470A-C. Such elements may correspond, or be similar, to miniature self-view UI portion 360, self-view 162, 262, and/or 362, and UI control elements 238 and/or 366, 373, and 370 as seen and described in FIGS. 1-3. Accordingly, such features and components as seen and described with respect to FIGS. 4A-C may incorporate and augment at least the corresponding embodiments seen and described with respect to FIGS. 1-3.

FIG. 4A illustrates an example self-view UI portion of FIG. 1, in accordance with some embodiments of the present disclosure. Specifically, FIG. 4A illustrates a self-view UI portion 460A including a miniature self-view 462A embedded within UI control element 466A. UI control elements 466A, 474A, and 470A may correspond to controls for switching self-view modes, sharing a document, and activating and deactivating video and audio feeds of a user. Within the embodiment seen in FIG. 4A, both a user's video and audio feed are activated.

Within the embodiment shown in FIG. 4A (and as was similarly described with respect to FIG. 3, and incorporating and augmenting the embodiments discussed therein), the UI control element 466A may include the miniature self-view 462A, a sliding, anterior portion 467A of the UI control element 466A, and a posterior portion 468A. UI control element 470A may similarly include an anterior portion 471A and a posterior portion 472A.

Since both audio and video capture are active within the embodiment shown in FIG. 4A, miniature self-view 462A may be active, and displaying a real-time video of the user of an associated device. Similarly, UI control element 470A may by dynamic, and the three bars shown in anterior portion 471A may be dynamic, or reflective acoustic changes in the captured audio feed. Thus, through such embodiments, self-view UI portion 460A may unobtrusively yet poignantly indicate the operational status of both a user's audio and video feed.

In accordance with the description and embodiments provided within FIG. 3, one must bear in mind that the embodiment seen in FIG. 4A is a simplified version of the self-view UI portion, according to some embodiments of the present disclosure. In further embodiments, portion 460A may include any number of control elements, and/or function as a virtual meeting control panel. One of ordinary skill in the art, having the benefit of this disclosure, will appreciate that numerous layouts, configurations, visual indicators, and UI control element types for self-view UI portion 460A exist, and that self-view UI portion 460A as seen in FIG. 4A is an exemplary representation of a self-view UI portion associated with the system.

FIG. 4B illustrates an example self-view UI portion, in accordance with some embodiments of the present disclosure. Specifically, FIG. 4B illustrates a self-view UI portion 460B including a miniature self-view 462B embedded within UI control element 466B. UI control elements 466B, 474B, and 470B may correspond to controls for switching self-view modes, sharing a document, and activating and deactivating video and audio feeds of a user. Within the embodiment seen in FIG. 4B, a user's video feed is active, and the user's audio feed is deactivated.

Within the embodiment shown in FIG. 4B (and as was similarly described with respect to FIG. 3, and incorporating and augmenting the embodiments discussed therein), the UI control element 466B may include the miniature self-view 462B, a sliding, anterior portion 467B of the UI control element 466B, and a posterior portion 468B. UI control element 470B may similarly include an anterior portion 471B and a posterior portion 472B. Since video capture is active within the embodiment shown in FIG. 4B, miniature self-view 462B may be active, and displaying a real-time video of the user of an associated device. In contrast to both UI control element 466B and FIG. 4A, audio capture may be inactive, or deactivated. As such, UI control element 470B may be a static image, and the three bars shown in anterior portion 471B may be unchanging, or paused at their current position, indicating the status of the audio feed. Thus, through such embodiments, self-view UI portion 460B may unobtrusively yet poignantly indicate the operational status of both a user's audio and video feed.

In accordance with the description and embodiments provided within FIG. 3, one must bear in mind that the embodiment seen in FIG. 4B is a simplified version of the self-view UI portion 460B, according to some embodiments of the present disclosure. In further embodiments, portion 460B may include any number of control elements, and/or function as a virtual meeting control panel. One of ordinary skill in the art, having the benefit of this disclosure, will appreciate that numerous layouts, configurations, visual indicators, and UI control element types for portion 460B and self-view UI portion 460B exist, and that self-view UI portion 460B as seen in FIG. 4B is an exemplary representation of a self-view UI portion associated with the system.

FIG. 4C illustrates an example self-view UI portion, in accordance with some embodiments of the present disclosure. Specifically, FIG. 4C illustrates a self-view UI portion 460C including a self-view 462C (in this embodiment displaying a static image or an avatar of a user) embedded within UI control element 466C. In embodiments, UI control elements 466C, 470C, and 474C may correspond to controls for switching the self-view mode, activating and deactivating video and audio feeds of a user, and sharing a document. Within the embodiment seen in FIG. 4C, a user's video feed is inactive, and the user's audio feed is active.

Within the embodiment shown in FIG. 4C (as was similarly described with respect to FIG. 3, and incorporating and augmenting the embodiments discussed therein), the UI control element 466C may include the miniature self-view 462C within a sliding, anterior portion 467C of the UI control element 466C, and a posterior portion 468C. UI control element 470C may similarly include an anterior portion 471C and a posterior portion 472C. The self-view UI portion 460C shown in FIG. 4C may be presented in response to receiving a mute camera command initiated via UI control element 466A or 466B, and may include static miniature self-view 462C that displays a still image or an avatar of the user of an associated device (or any other embodiment as was described with respect to FIG. 3).

Similarly to FIG. 4A, audio feed is active, and UI control element 470C may by dynamic, and the three bars shown in anterior portion 471C may be dynamic, or reflective acoustic changes in the captured audio feed. Thus, through such embodiments, self-view UI portion 460C may unobtrusively yet poignantly indicate the operational status of both a user's audio and video feed.

In accordance with the description and embodiments provided within FIG. 3, one must bear in mind that the embodiment seen in FIG. 4C is a simplified version of the self-view UI portion, according to some embodiments of the present disclosure. In further embodiments, portion 460C may include any number of control elements, and/or function as a virtual meeting control panel. One of ordinary skill in the art, having the benefit of this disclosure, will appreciate that numerous layouts, configurations, visual indicators, and UI control element types for self-view UI portion 460C exist, and that self-view UI portion 460C as seen in FIG. 4C is an exemplary representation of a self-view UI portion associated with the system.

Figure 5:
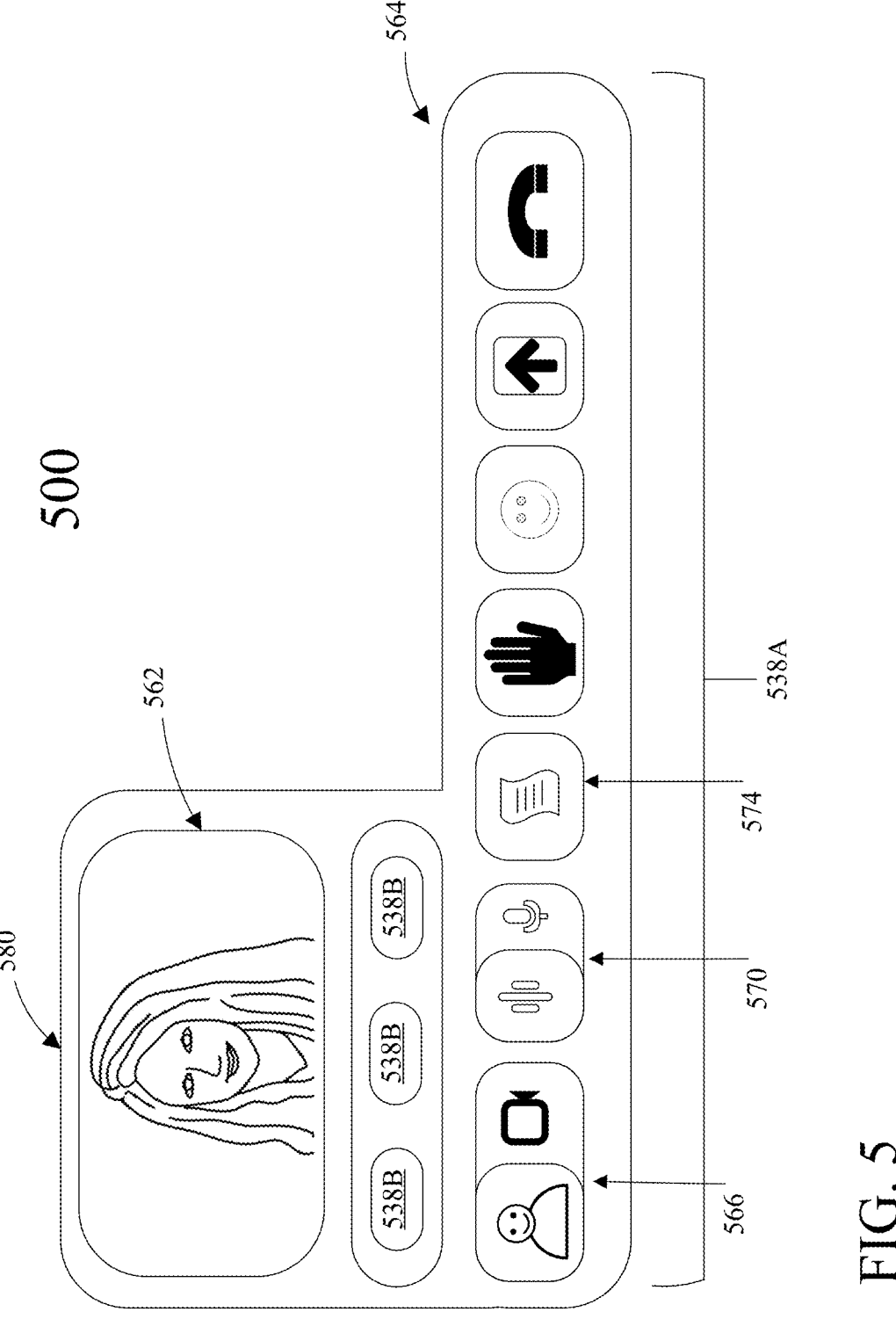
FIG. 5 illustrates an example overlay self-view mode, in accordance with one embodiment of the present disclosure.

FIG. 5 illustrates an example overlay self-view mode, in accordance with some embodiments of the present disclosure. In some embodiments, similar features and components as were described in with respect to FIGS. 1-4C may be used in the overlay self-view mode 500 illustrated in FIG. 5. For example, overlay self-view mode 500 may include an overlay portion 580 including a self-view 562, a control panel 564 including UI control elements 538A-B including UI control elements 566, 574, and 570. Such elements may correspond, or be similar, to self-view 162, 262, 362, 462A-C, control panel 264, 364, 464A-C, UI control elements 238, 338, UI control elements 366 and/or 466A-C, UI control elements 374, 474A-C, and UI control elements 370 and/or 470A-C, as seen and described in FIGS. 1-4C. Accordingly, such features and components as seen and described with respect to FIG. 5, may incorporate and augment at least the corresponding embodiments seen and described with respect to FIGS. 1-4C.

As seen, FIG. 5 illustrates an embodiment of an overlay self-view mode 500 including an overlay portion 580 showing an enlarged self-view 562 (when compared to the miniature self-view contained within an UI element such as UI control element 566). In some embodiments a user may select the option of engaging the overlay portion 580 and self-view 562 if a larger self-view image is required (e.g., so as to further inspect the self-view of oneself). The overlay portion 580 may be located in a visual extension of the control panel 564.

In some embodiments, the overlay portion 580 may temporarily expand from the control panel 564 (and/or the self-view UI portion as described with respect to FIGS. 3-4C). In embodiments, an UI control element may correspond to a command to engage the overlay portion, and the overlay portion may expand from the control panel 564 in response to a user input. For example, hovering a cursor, or selector over the control panel 564 may engage the overlay portion 580. Contrastively, in some embodiments, overlay portion 580 may be disengaged through either a user input associated with an UI control element, or through removal of a selector or cursor from the control panel 564.

In some embodiments, control panel 564 may contain UI control elements 538A, that contains more than just UI control elements corresponding to activating or deactivating audio and video capabilities, (e.g., in the form of added control buttons). Upon activating overlay portion 580, additional control buttons 538B may appear, and be used to control the display and self-view presented within overlay portion 580.

In some embodiments associated with the self-view 562, the overlay portion 580, and the typical grid size for all other client device video streams (e.g., as seen within main region 330 of FIG. 3.), including the video stream display windows, may increase in size. For example, in some embodiments, miniature self-view mode (and comparable components within the other figures of the disclosure) may be physically the smallest, or the video display may take up the smallest number of pixels. At an intermediate size, the overlay portion 580 or overlay mode may provide a medium size video window for the self-view, and provide moderate amount of detail. In further embodiments, and as the physically largest display, a UI control element may include a control to forgo both the smallest miniature self-view and the overlay self-view. Such an UI control element (e.g., UI control element 574) may be used to position the self-view video within the generic video streams from all other streaming devices. In other words, the self-view video stream may be included among the grid view including all other client device video streams (e.g., as seen within main region 330 of FIG. 3.).

Thus, in the embodiments seen within FIG. 5, the overlay self-view includes a mechanism (e.g., overlay portion 580), to temporarily expand the size and space taken by the miniature self-view, without becoming obtrusive or permanent.

Figure 6:
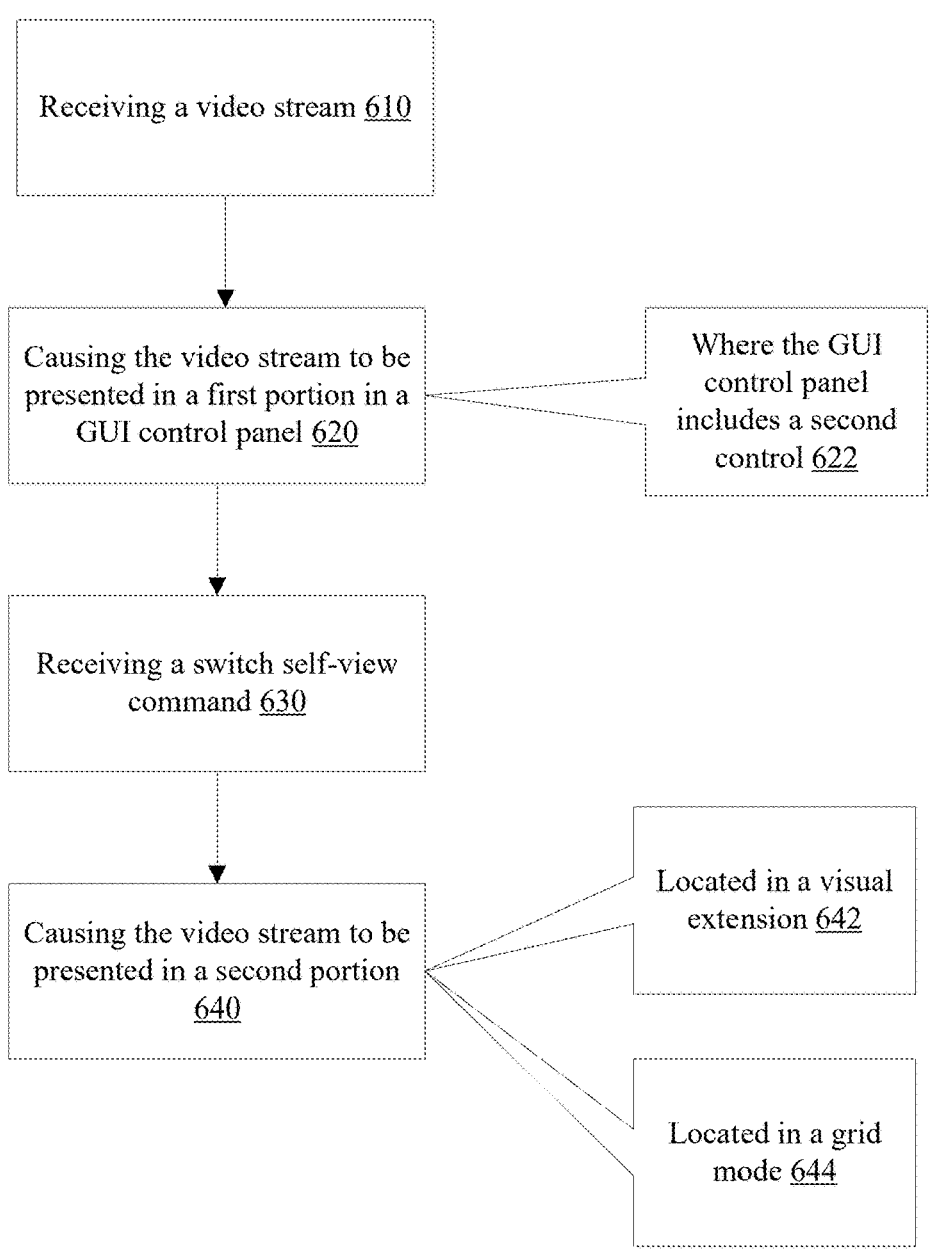
FIG. 6 illustrates a flow diagram of an example method for presenting the self-view within a UI of a virtual meeting, in accordance with some embodiments of the present disclosure.

FIG. 6 illustrates a flow diagram of an example method for displaying the self-view UI portion of FIG. 1 within a virtual meeting, in accordance with some embodiments of the present disclosure. Method 600 may be performed by a processing device that may include hardware, software, or a combination of both. The processing device may include one or more central processing units (CPUs), graphics processing units (GPUs), field-programmable gate arrays (FPGAs), application-specific integrated circuits (ASICs), or the like, or any combination thereof. In one embodiment, method 600 may be performed by the processing devices and the associated algorithms, e.g., as described in conjunction with FIGS. 1-2. In certain embodiments, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated descriptions list the operations of method 600 in a certain order, in some embodiments, at least some of the described operations may be performed in parallel and/or in a different order. In some embodiments one or more operations of method 600 is not performed.

At block 610, method 600 may include receiving a self-view video stream including a self-view of a user of a client device participating in a virtual meeting, where the video stream is being acquired by a camera of the client device.

At block 620, method 600 may include causing the self-view video stream to be presented in a first self-view portion incorporated into a GUI control panel of a GUI displayed on the client device of the user, where the GUI control panel includes a first GUI control element to control the camera. In some embodiments, the first self-view portion is visually associated with the first GUI control element that includes a pictogram identifying the state of the camera, where the state of the camera can be represented by a mute state or an active state.

In some embodiments, as seen in block 622, the GUI control panel also includes a second GUI control element to control a microphone of the client device.

At block 630, method 600 may include receiving, via the GUI, a switch self-view command of the user. The switch self-view command can be a user request to switch to an overlay self-view mode (e.g., by hovering over the miniaturized self-view), which presents the user's self-view in a larger size and can be available as long as needed (e.g., can be switched back when the hovering over the miniaturized self-view ends). Alternatively, the switch self-view command can be a user request to switch to a grid self-view mode (e.g., by clicking on the visual representation of the miniaturized self-view), which presents a visual item corresponding to the user's video stream along with (and using the same size as) visual items corresponding to video streams of other participants of the virtual meeting.

At block 640, method 600 may include causing the video stream to be presented in a second portion. In some embodiments, this may include responsive to receiving the switch self-view command, causing the self-view video stream to be presented in a second self-view portion located outside of the GUI control panel of the GUI displayed on the client device of the user.

At block 642, method 600 may include responsive to receiving the switch self-view command, causing the self-view video stream to be presented in a second self-view portion located outside of the GUI control panel of the GUI displayed on the client device of the user In some embodiments, this may include causing the self-view video stream to be presented in a second self-view portion located in a visual extension of the GUI control panel. Alternatively, the second self-view portion is located in a grid view (as seen in block 644) of video streams transmitted by client devices of other participants of the virtual meeting.

In some embodiments, method 600 may further include receiving a mute camera command initiated via the first GUI control element, and responsive to receiving the mute camera command, rendering an avatar of the user in the first self-view portion.

Figure 7:
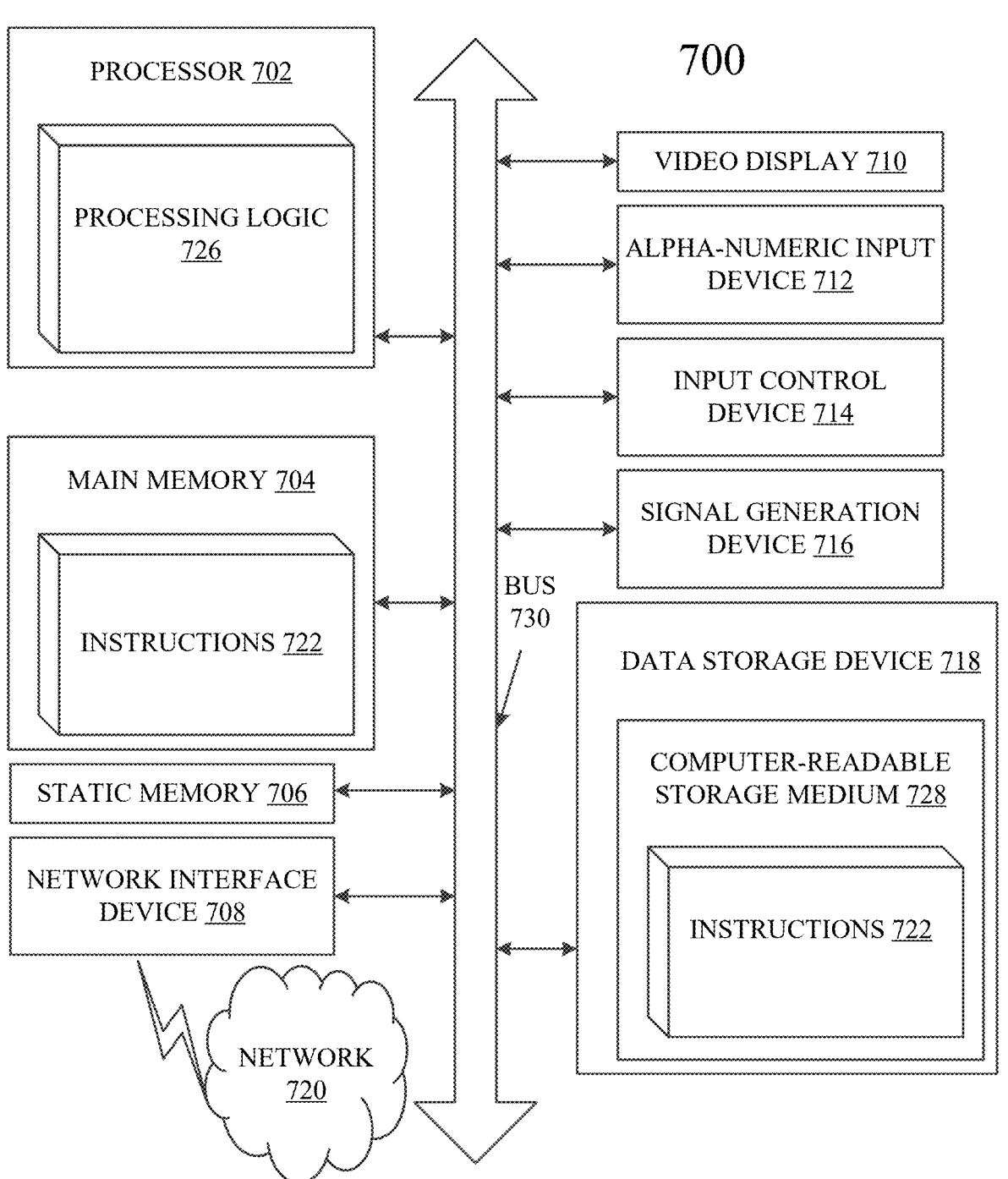
FIG. 7 depicts a block diagram of an example processing device operating in accordance with one or more embodiments of the present disclosure.

FIG. 7 illustrates a block diagram of an example processing device 700 operating in accordance with one or more aspects of the present disclosure. In one implementation, the processing device 700 may be a part of any computing device of FIG. 1, or any combination thereof. Example processing device 700 may be connected to other processing devices in a LAN, an intranet, an extranet, and/or the Internet. The processing device 700 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 700 may include a processor 702 (e.g., a CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processor 702 represents one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 702 may be configured to execute instructions (e.g. processing logic 726 may implement the self-view UI portion of FIG. 1).

Example processing device 700 may further include a network interface device 708, which may be communicatively coupled to a network 720. Example processing device 700 may further comprise a video display 710 (e.g., a liquid crystal display (LCD), a touch screen, or a cathode ray tube (CRT)), an alphanumeric input device 712 (e.g., a keyboard), an input control device 714 (e.g., a cursor control device, a touch-screen control device, a mouse), and a signal generation device 716 (e.g., an acoustic speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions (e.g. instructions for implementing the self-view UI portion of FIG. 1).

Executable instructions 722 may also reside, completely or at least partially, within main memory 704 and/or within processor 702 during execution thereof by example processing device 700, main memory 704 and processor 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware, or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first," "second," "third," "fourth," etc. as used herein are meant as labels to distinguish among different elements and may not necessarily have an ordinal meaning according to their numerical designation.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media, and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
receiving, by a processing device, a self-view video stream comprising a self-view of a user of a client device participating in a virtual meeting, wherein the self-view video stream is being acquired by a camera of the client device;
causing the self-view video stream to be presented in a first self-view portion incorporated into a graphical user interface (GUI) control panel of a GUI displayed on the client device of the user, the GUI control panel comprising a first GUI control element to control the camera;
receiving, via the GUI, a switch self-view command of the user; and
responsive to receiving the switch self-view command, causing the self-view video stream to be presented in a second self-view portion located outside of the GUI control panel of the GUI displayed on the client device of the user.

2. The method of claim 1, wherein the GUI control panel further comprises a second GUI control element to control a microphone of the client device.

3. The method of claim 1, wherein the second self-view portion is located in a visual extension of the GUI control panel.

4. The method of claim 3, further comprising:
receiving a command to switch the self-view to a grid mode; and
responsive to receiving the command to switch the self-view to the grid mode, rendering, in the GUI displayed on the client device of the user, the self-view video stream in a third self-view portion located in a grid view of video streams transmitted by client devices of other participants of the virtual meeting.

5. The method of claim 1, wherein the second self-view portion is located in a grid view of video streams transmitted by client devices of other participants of the virtual meeting.

6. The method of claim 1, further comprising:
receiving a mute camera command initiated via the first GUI control element; and
responsive to receiving the mute camera command, rendering an avatar of the user in the first self-view portion.

7. The method of claim 1, wherein the first self-view portion is visually associated with the first GUI control element that comprises a pictogram identifying a state of the camera, wherein the state of the camera is represented by one of: a mute state or an active state.

8. A system comprising:
a memory device; and
a processing device communicatively coupled to the memory device, wherein the processing device is to:
receive, by the processing device, a self-view video stream comprising a self-view of a user of a client device participating in a virtual meeting, wherein the self-view video stream is being acquired by a camera of the client device;
cause the self-view video stream to be presented in a first self-view portion incorporated into a graphical user interface (GUI) control panel of a GUI displayed on the client device of the user, the GUI control panel comprising a first GUI control element to control the camera;
receive, via the GUI, a switch self-view command of the user; and
responsive to receiving the switch self-view command, cause the self-view video stream to be presented in a second self-view portion located outside of the GUI control panel of the GUI displayed on the client device of the user.

9. The system of claim 8, wherein the GUI control panel further comprises a second GUI control element to control a microphone of the client device.

10. The system of claim 8, wherein the second self-view portion is located in a visual extension of the GUI control panel.

11. The system of claim 10, wherein the processing device is further to:

receive a command to switch the self-view to a grid mode; and responsive to receiving the command to switch the self-view to the grid mode, render in the GUI displayed on the client device of the user, the self-view video stream in a third self-view portion located in a grid view of video streams transmitted by client devices of other participants of the virtual meeting.

12. The system of claim 8, wherein the second self-view portion is located in a grid view of video streams transmitted by client devices of other participants of the virtual meeting.

13. The system of claim 8, wherein the processing device is further to:

receive a mute camera command initiated via the first GUI control element; and responsive to receiving the mute camera command, render an avatar of the user in the first self-view portion.

14. The system of claim 8, wherein the first self-view portion is visually associated with the first GUI control element that comprises a pictogram identifying a state of the camera, wherein the state of the camera is represented by one of: a mute state or an active state.

15. A non-transitory computer readable storage medium comprising instructions that, when executed by a processing device, causes the processing device to perform operations comprising:

receiving, by the processing device, a self-view video stream comprising a self-view of a user of a client device participating in a virtual meeting, wherein the self-view video stream is being acquired by a camera of the client device;

causing the self-view video stream to be presented in a first self-view portion incorporated into a graphical user interface (GUI) control panel of a GUI displayed on the client device of the user, the GUI control panel comprising a first GUI control element to control the camera;

receiving, via the GUI, a switch self-view command of the user; and responsive to receiving the switch self-view command, causing the self-view video stream to be presented in a second self-view portion located outside of the GUI control panel of the GUI displayed on the client device of the user.

16. The non-transitory computer readable storage medium of claim 15, wherein the GUI control panel further comprises a second GUI control element to control a microphone of the client device.

17. The non-transitory computer readable storage medium of claim 15, wherein the second self-view portion is located in a visual extension of the GUI control panel.

18. The non-transitory computer readable storage medium of claim 17, wherein the operations further comprise:

receiving a command to switch the self-view to a grid mode; and responsive to receiving the command to switch the self-view to the grid mode, rendering, in the GUI displayed on the client device of the user, the self-view video stream in a third self-view portion located in a grid view of video streams transmitted by client devices of other participants of the virtual meeting.

19. The non-transitory computer readable storage medium of claim 15, wherein the second self-view portion is located in a grid view of video streams transmitted by client devices of other participants of the virtual meeting.

20. The non-transitory computer readable storage medium of claim 15, wherein the operations further comprise:

receiving a mute camera command initiated via the first GUI control element; and responsive to receiving the mute camera command, rendering an avatar of the user in the first self-view portion.

* * * * *